Nov. 18, 1969  W. M. SWARTZ  3,478,454
DISPLAY DEVICE
Filed May 15, 1967
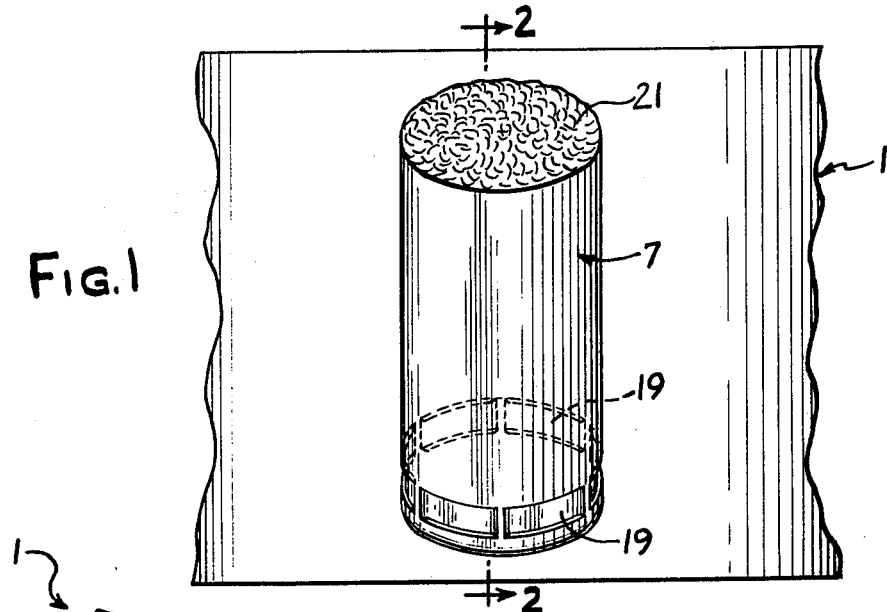
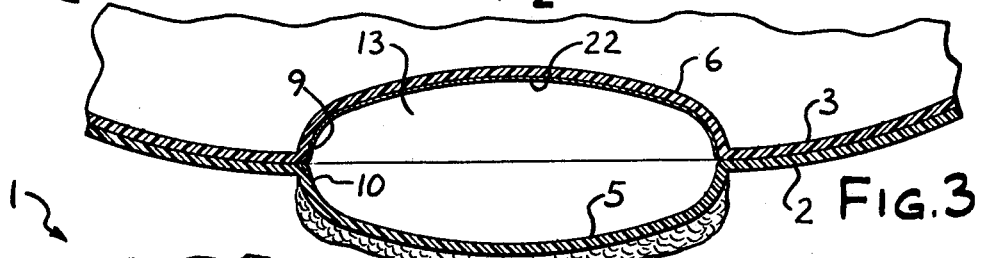
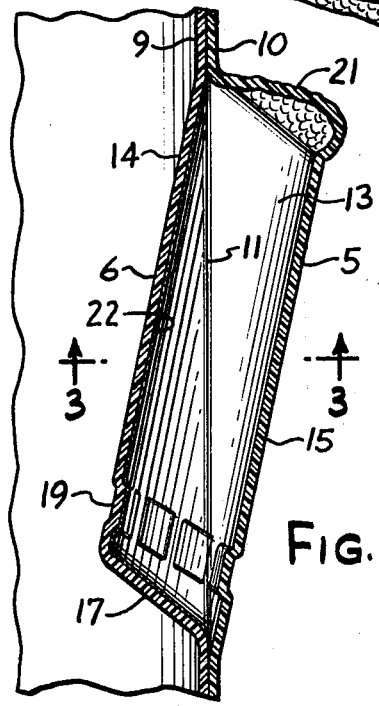
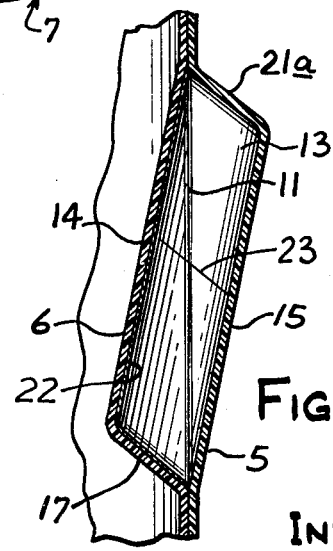
INVENTOR
WILLIAM M. SWARTZ
by: Spector & Alster ATTYS.

United States Patent Office 3,478,454
Patented Nov. 18, 1969

3,478,454
DISPLAY DEVICE
William M. Swartz, 1430 W. Wrightwood Ave.,
Chicago, Ill. 60614
Filed May 15, 1967, Ser. No. 638,275
Int. Cl. G09f 19/12; B44f 7/00
U.S. Cl. 40—126                                        4 Claims

ABSTRACT OF THE DISCLOSURE

A display device comprises two sheets having designs that are embossed in opposite directions and are placed together to make up a three-dimensional object having an actual depth less than the illusory depth. One of the designs may be sufficiently transparent to permit observation of the other design therethrough. The embossings are shaped to produce highlights comparable to those on a full depth object. Portions of the embossings extend across the cavity therebetween and simulate surfaces in perspective.

---

This invention relates to improvements in display devices, particularly those used for advertising displays. In many advertising displays an attempt is made to give the parts thereof a three-dimensional effect or illusion in order to enhance the attention-getting qualities of the display. These qualities, being inherent in a full round view of food products, such as an apple, a glass of beverage, etc., are qualities that lend appetite appeal to the product. A simple attempt to obtain these qualities is merely to draw the parts of the display in perspective on plane or a curved surface, putting in highlights in appropriate places on the figures. However, in a perspective drawing, the lines or contour-indicating portions of the figures are always spaced apart the same distance along the surface of the drawing, and the highlights are always fixed relative to other parts of the figures. The result is that when the viewer observes the display and moves relative to it, the viewer sees these contours or lines in the same apparent spacial relationship and gets little or no illusion of depth of of the display. Furthermore, the highlights do not move, which further detracts from creating an illusion of true three-dimensional shape. Of course, the display might be fabricated with the figures in actual three-dimensional size. This will give the viewer a true feeling of depth of the display with highlights that move when the viewer moves, but to construct displays in this manner is often uneconomical or impractical in terms of the space required for the display.

A further way of making three-dimensional displays lies in the use of a lenticular system laminated onto a pictorial such that the viewer appears to see the pictorial in three dimensions when his eyes view the lenticular system from one side and then the other. This type of system requires an exceedingly accurate registration of the laminates and thus results in a high cost and/or a high spoilage rate. Furthermore, there is only a limited depth of field in which the pictorial can be seen through the lens system, making it impractical for many point of purchase advertising displays. There are practical limits in which this system can be worked. It either can be viewed from close up or from a distance, but the same display cannot be viewed from closeup and a distance because of the limitations of the method. Many individuals with quite common visual difficulties are unable to "see" the effect. Also, the system fails to produce the necessary moving highlights, which are so important to give a realistic appearance of a three-dimensional pictorial. Finally, such a system tends to "cloud" the pictorial in that it appears to the viewer as if the pictorial is slightly out of focus.

It is an object of this invention to provide an article of manufacture, such as a greeting card, an advertising display, or the like, in which the design to be displayed gives the illusion of full depth and yet the design is of an actual depth that is only a fractional part of its apparent depth. The resultant display gives the illusion of full depth for design because the parts thereof appear to be relatively displaced and the highlights move when the viewer moves.

In a preferred form of the invention, the display comprises front and back adjacent sheets of material with embossed portions of the design thereon corresponding to the desired external shape of the design. The two embossings, the front being generally convex and the back being generally concave, form a hollow therebetween representing the actual depth of the design, which is much less than the apparent or illusory depth. The front sheet embossing is at least in part sufficiently transparent to permit observation of the back sheet embossing therethrough, and the two designs may include cooperating portions that appear as one or more surfaces in perspective extending across the hollow. The cooperating portions may include a section of one embossing which slopes toward the other embossing to provide the perspective effect.

It is a further object of this invention to provide an article of manufacture of the type stated in which the back sheet is opaque yet is mirror-like or highly reflective and wherein the curvatures of the front and back embossings are shaped to give surface highlights that produce the full depth illusion intended. The curvatures of the two embossings act synergistically to produce highlights comparable to those that would be present on a full depth design and which move at a speed comparable to that of a full depth object.

In the drawing wherein like reference characters indicate like parts:

FIG. 1 is a fragmentary front-elevational view of a display device constructed in accordance with and embodying the present invention;

FIG. 2 is a fragmentary sectional view taken along lines 2—2 of FIG. 1;

FIG. 3 is a fragmentary sectional view taken along line 3—3 of FIG. 2; and

FIG. 4 is a fragmentary sectional view similar to FIG. 2 and showing a modified form of the invention.

Referring now in more detail to the drawing, 1 designates an advertising display comprising front and back sheets 2, 3, each of which may be of a suitable plastic material. The front and back sheets 2, 3 each embossings 5, 6 which cooperate to define a three-dimensional figure or article 7. In the form of the invention herein shown, the article 7 is a simulated glass of generally cylindrical shape, but it should be understood that the article 7 may be of a different shape or may be representative of other objects, the herein illustrated glass being merely an example of one object that may be constructed in accordance with this invention.

The embossing 5 on the front sheet is generally concave and the embossing 6 on the back sheet is generally convex, and the two sheets 2, 3 are placed in face-to-face engagement so that the margin 9 of the embossing 6 and the margin 10 of the embossing 5 are substantially coincident at parting line 11. Thus, the embossing on one sheet is substantially a continuation of the design embossed on the other sheet with the two embossings defining a cavity 13 therebetween. The distance across the cavity 13 from one embossing 5 to the other embossing 6 represents the actual thickness or depth of the article 7. Remote from the article 7, sheets 2, 3 may be curved, as shown in FIG. 3, or they may be of other configuration, depending upon the nature of the display 1. Also, the sheets 2, 3 may be embossed in other regions remote from the article 7 to provide other articles or figures on the display.

In the simulated glass herein illustrated as the article 7, portions 14, 15 of the embossings 5, 6 define the side wall of the glass, while a portion 17 defines the bottom of the glass. The embossings 5, 6 may, furthermore, be formed with dimples 19 near the bottoms of the portions 14, 15, which are struck inwardly toward the hollow 13 to provide an ornamental design for the bottom part of the side wall of the glass. The top of the article 7 may be represented by a portion 21 of the embossing 5. In the example illustrated, the glass may be one represented as being filled with a carbonated beverage and the irregular top portion 21 may depict the overflowing foam of the beverage. The part 15 of the front embossing 5 below the portion 21 is colored or colorless, as is desired, but is sufficiently transparent to permit observation of the embossing 6 therethrough. The back sheet embossing 6 may be opaque and coated on the surface that is presented toward the front embossing 5 with a highly reflective coating 22 of a color suitable for the article 7. The top portion 21 may be of lesser transparency than the rest of the embossing 5 and of a contrasting color.

When the article 7 is viewed generally normal to the parting line 11, it will appear as a "three-dimensional perspective" due to the fact that the side of the glass is angled with respect to the general plane of viewing and the top and bottom portions 17, 21 of the article appear as surfaces in perspective extending across the cavity 13. This article has an actual depth across the cavity or across one of the perspective surfaces which is much less than the width thereof. In the present example, this results in the perspective surfaces being generally elliptical. Nevertheless, the article 7 gives to the casual observer an illusion of being its actual full depth whereas in fact the article 7 is only a fraction of its illusory depth. When a person views the article 7 and moves relative thereto, the highlight or highlights thereon are not static but appear in size and in speed comparable to that of an actual full-rounded object. Portions of the design on the embossing 6 appear displaced from those on the embossing 5 to a moving viewer.

FIG. 4 shows a form of the invention which is similar to that shown in FIGS. 1–3, except that the article depicted is a glass, bottle, or other container which is intended to appear as if the same were partially filled with liquid up to the line 23. To produce this visual effect, the inside surface of the embossing 6 below the line 23 and the color of the material of the embossing 5 below the line 23 may be color-contrasted with those corresponding portions above line 23. The portion 21a may be colorless. The line 23 is on both embossings 5, 6, and line the surface 17, results in the appearance of a surface in perspective extending across the cavity 13. When the article of FIG. 4 is viewed normal to the parting line 11, the line 23 will appear as an ellipse but will give the illusion of being cylindrical.

It is understood that the invention is not limited to the precise constructions herein shown, the same being merely illustrative of the principles of the invention.

What is considered new and sought to be secured by Letters Patent is:

1. A device comprising a front sheet of material having a forwardly embossed design portion forming a part of a three-dimensional article, and a rear sheet of material having a rearwardly embossed design portion forming another part of said article, the sheets being positioned with the margin of one design portion substantially coincident with the margin of the other design portion and such that the design portion on one sheet is substantially a continuation of the design portion on the other sheet and the two design portions define a cavity between the sheets, at least part of the front sheet being sufficiently transparent to permit observation of the rear sheet therethrough, said margins defining a parting line of said article and the two design portions providing a design having opposite ends, said forward embossed portion having a depth as measured from the parting line that progressively decreases in a direction toward one end, said rearwardly embossed portion having a depth as measure from the parting line that progressively decreases in a direction toward said opposite end, and said design having at least one surface extending across the cavity substantially at an acute angle to said parting line whereby the design gives the appearance of a three-dimensional article in perspective.

2. A device according to claim 1 in which the depth of said cavity as measured across said perspective surface is less than the width of said cavity as measured across said perspective surface.

3. A device according to claim 1 in which the article has a longitudinal axis that is at an acute angle to said parting line.

4. A device according to claim 1 in which the surface of the design portion on said rear sheet is of higher light-reflectiveness than that of the design portion that is embossed on the front sheet and is contoured to enhance highlights on the front design portion.

References Cited

UNITED STATES PATENTS

| 2,073,479 | 3/1937 | Jensen | 40—126 |
| 2,127,910 | 8/1938 | French. | |
| 2,140,327 | 12/1938 | Mould | 40—126 X |

FOREIGN PATENTS

| 518,839 | 2/1931 | Germany. |

EUGENE R. CAPOZIO, Primary Examiner

R. CARTER, Assistant Examiner